Jan. 8, 1946.　　　A. P. ATHERTON　　　2,392,448
PARACHUTE
Filed Dec. 1, 1944　　　7 Sheets-Sheet 1
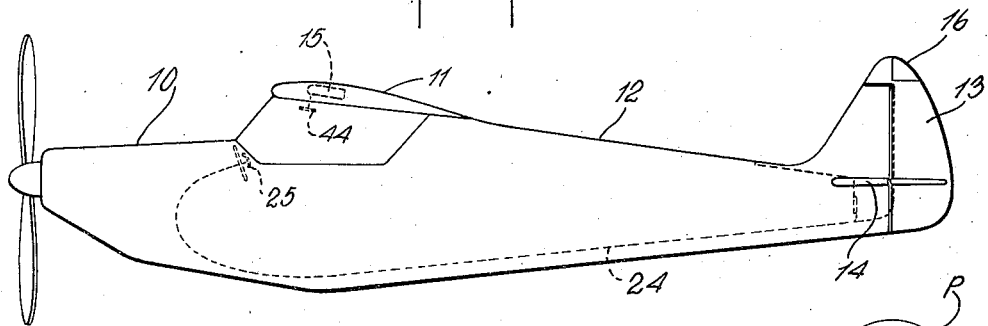
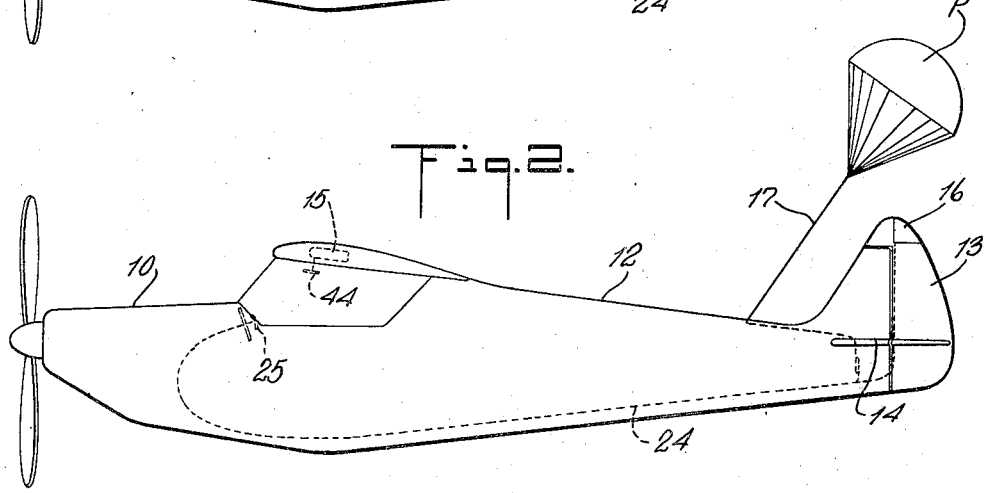
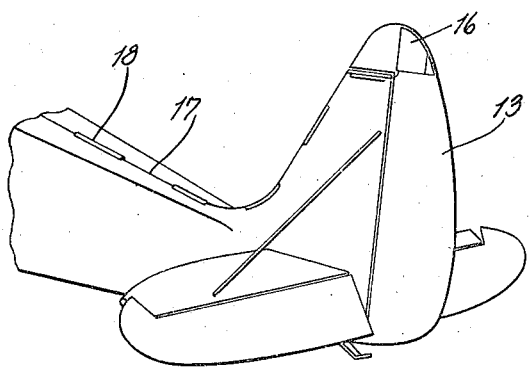
INVENTOR
Archie P. Atherton
BY
Kenyon & Kenyon
ATTORNEYS Jan. 8, 1946. A. P. ATHERTON 2,392,448
PARACHUTE
Filed Dec. 1, 1944 7 Sheets-Sheet 2
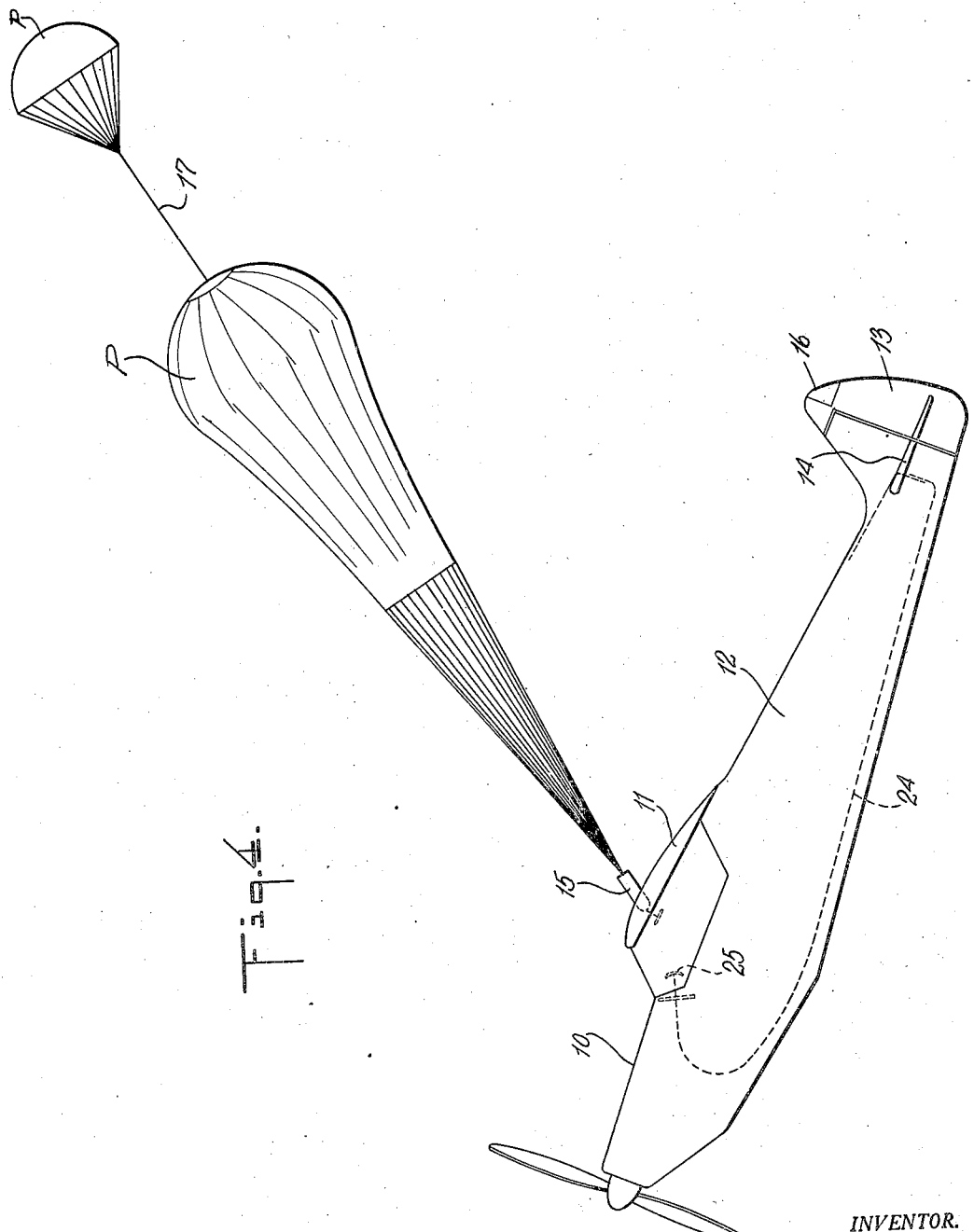

Jan. 8, 1946. A. P. ATHERTON 2,392,448
PARACHUTE
Filed Dec. 1, 1944 7 Sheets-Sheet 3

INVENTOR.
Archie P. Atherton
BY
Kenyon & Kenyon
ATTORNEYS

Jan. 8, 1946.  A. P. ATHERTON  2,392,448
PARACHUTE
Filed Dec. 1, 1944  7 Sheets-Sheet 4
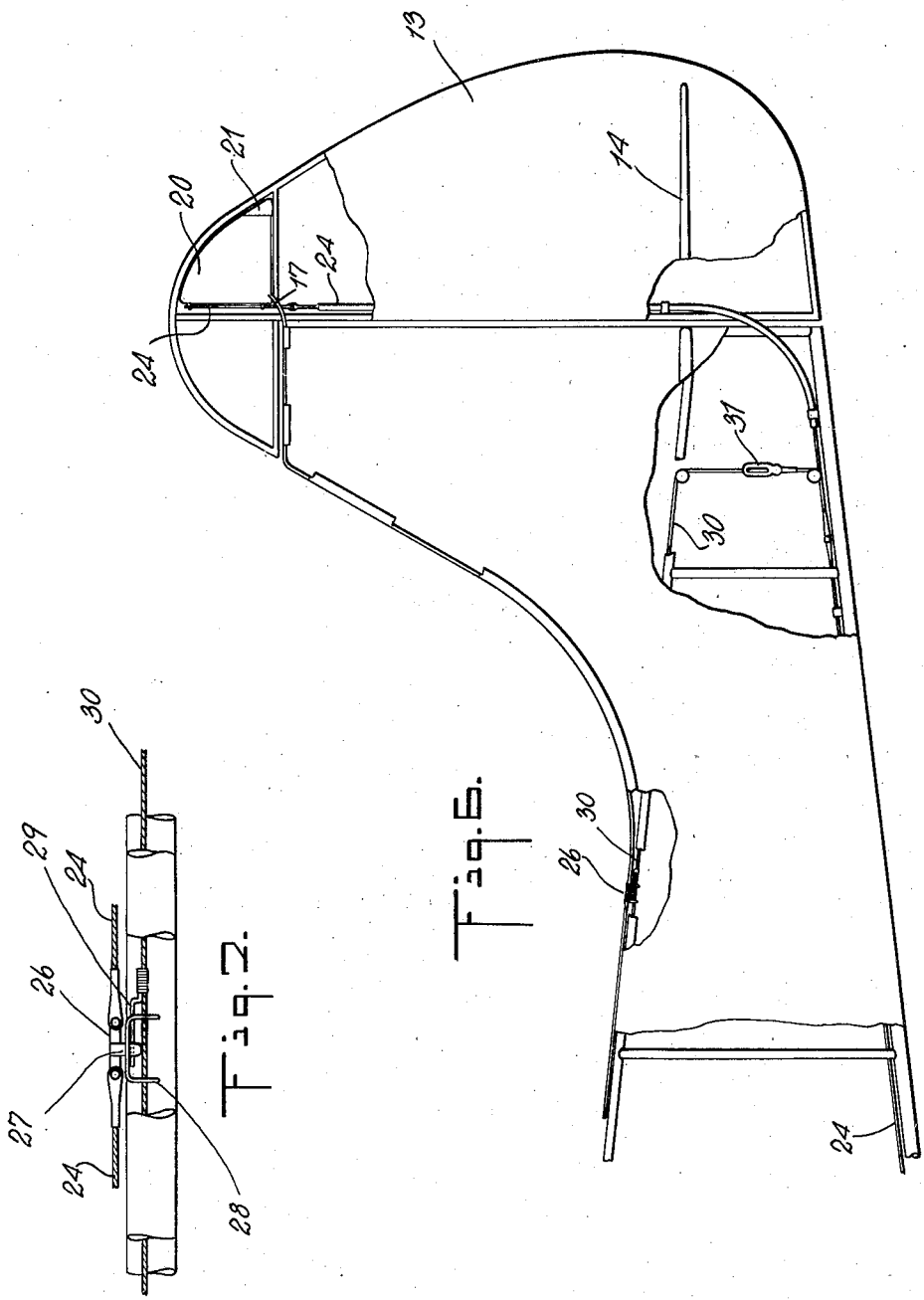
INVENTOR
Archie P. Atherton
BY
Kenyon & Kenyon
ATTORNEYS Jan. 8, 1946. A. P. ATHERTON 2,392,448
PARACHUTE
Filed Dec. 1, 1944 7 Sheets-Sheet 5

INVENTOR
Archie P. Atherton
BY
Kenyon & Kenyon
ATTORNEYS

Jan. 8, 1946.    A. P. ATHERTON    2,392,448
PARACHUTE
Filed Dec. 1, 1944    7 Sheets-Sheet 6

INVENTOR
Archie P. Atherton
BY
Kenyon + Kenyon
ATTORNEYS

Jan. 8, 1946.  A. P. ATHERTON  2,392,448
PARACHUTE
Filed Dec. 1, 1944  7 Sheets-Sheet 7
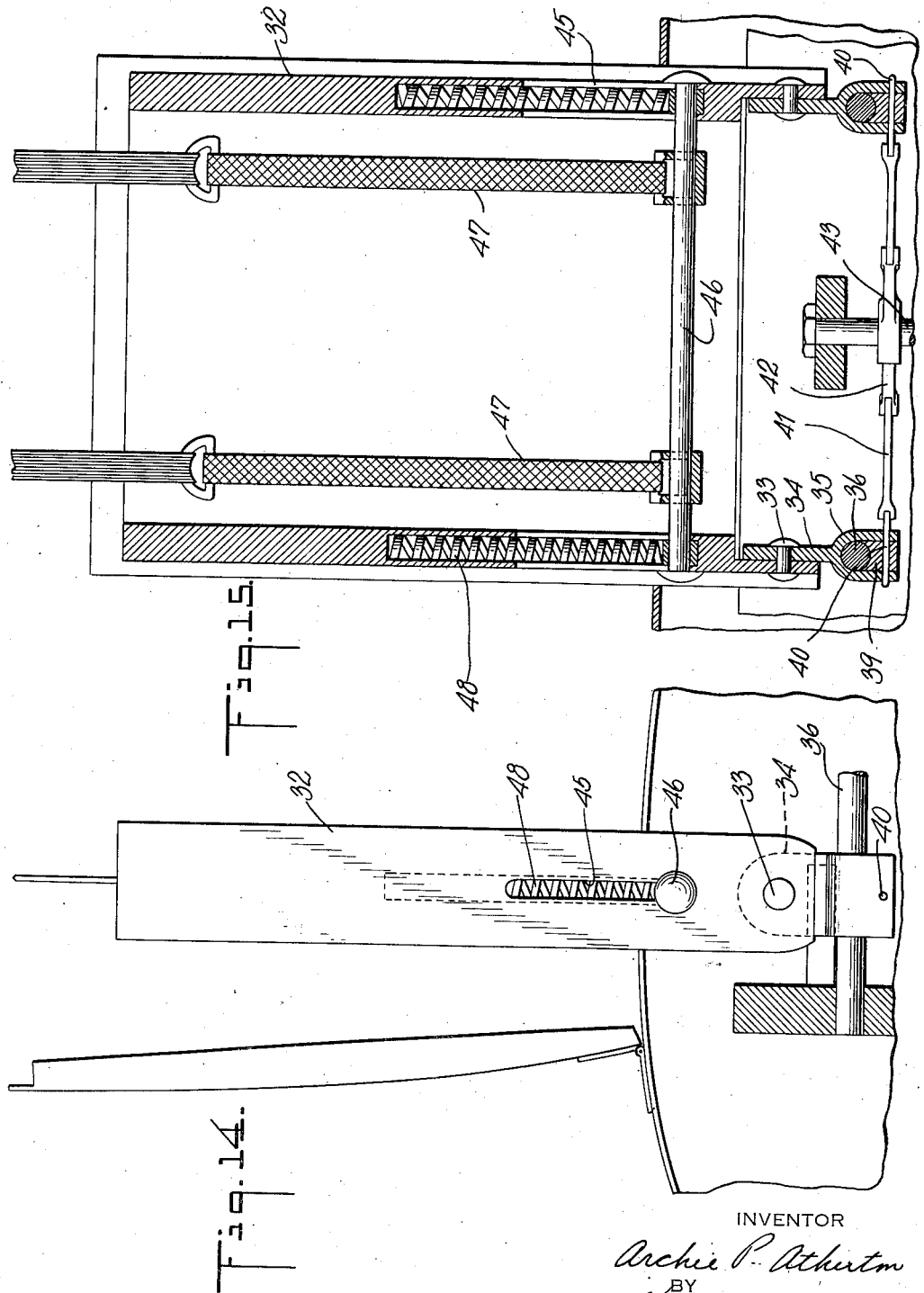
INVENTOR
Archie P. Atherton
BY
Kenyon & Kenyon
ATTORNEYS Patented Jan. 8, 1946

2,392,448

UNITED STATES PATENT OFFICE 2,392,448

PARACHUTE

REISSUED

Archie P. Atherton, Glendale, Calif.

Application December 1, 1944, Serial No. 566,048

APR 1 1947

11 Claims. (Cl. 244—139)

This invention relates to parachutes and more especially to a parachute for use in checking the descent of a disabled aircraft or an aircraft which has gotten out of control of the aviator.

An object of this invention is to provide an aircraft with parachute storage facilities of such nature that the parachute may easily and quickly be released by the aviator and brought into operating position without danger of the parachute becoming fouled in the aftergear of the aircraft.

A further object of this invention is a suitable connection between the aircraft and the parachute by means of which the aviator may release the parachute from the aircraft if, after a period of use of the parachute, the condition requiring its use has ceased to exist.

According to one embodiment of this invention, the parachute is stored in a box-like container arranged within the body of an airplane at approximately its center of gravity. The container is pivotally attached at one end to the airplane body through the medium of separable connecting means which may be disconnected by the aviator if so desired. The airplane body is provided with a pivoted cover overlying the container which normally is arranged completely within the wing and the cover is kept in closed position by a latch. A pilot parachute is stored in a compartment provided in a suitable part of the airplane such, for example, as in the rudder and a releasable cover for the compartment is held in place by suitable latch means. A cable connects the pilot parachute shrouds to the peak of the main parachute and is detachably anchored at a point near the rear of the airplane. The cover latch is connected to said cable. Means are provided for operation by the aviator to release the pilot parachute while retaining the cable in anchored condition. In the event that the aviator has released the pilot parachute because of a tailspin, the release of it may be sufficient to bring the airplane out of the tailspin and it may be unnecessary to release the main parachute. The pilot parachute rises above the airplane about the anchor point as a pivot and clears the aftergear of the airplane. Assuming that it is necessary to release the main parachute, the aviator disconnects the cable anchor by additional movement of the pilot parachute releasing means and the pilot parachute rises higher into the air about the main parachute cover edge as a pivot and effects release of the cover latch. The pilot parachute then draws out the main parachute and because of the elevation of the pilot parachute above the aftergear of the airplane the main parachute is lifted clear of said aftergear so that there is no possibility of the main parachute becoming fouled therein. The main parachute may be kept in operating position until the airplane has reached the ground or if the aviator regains control of the airplane, the parachute may be disconnected from the airplane by the means above referred to.

Other objects, novel features and advantages of this invention will become apparent from the following specification and accompanying drawings, wherein:

Fig. 1 is a side elevation of an airplane embodying the invention;

Fig. 2 is a similar view with the pilot parachute released;

Fig. 3 is a rear perspective of a portion of Fig. 1;

Fig. 4 is a side elevation of the plane with the main parachute partially withdrawn from its carrier;

Fig. 6 is an enlarged side elevation similar to Fig. 1 partially broken away;

Fig. 7 is an enlarged detail view;

Fig. 14 is an enlarged fragmentary vertical section similar to Fig. 11, and

Fig. 15 is a section on the line 15—15 of Fig. 14.

Figure 5:
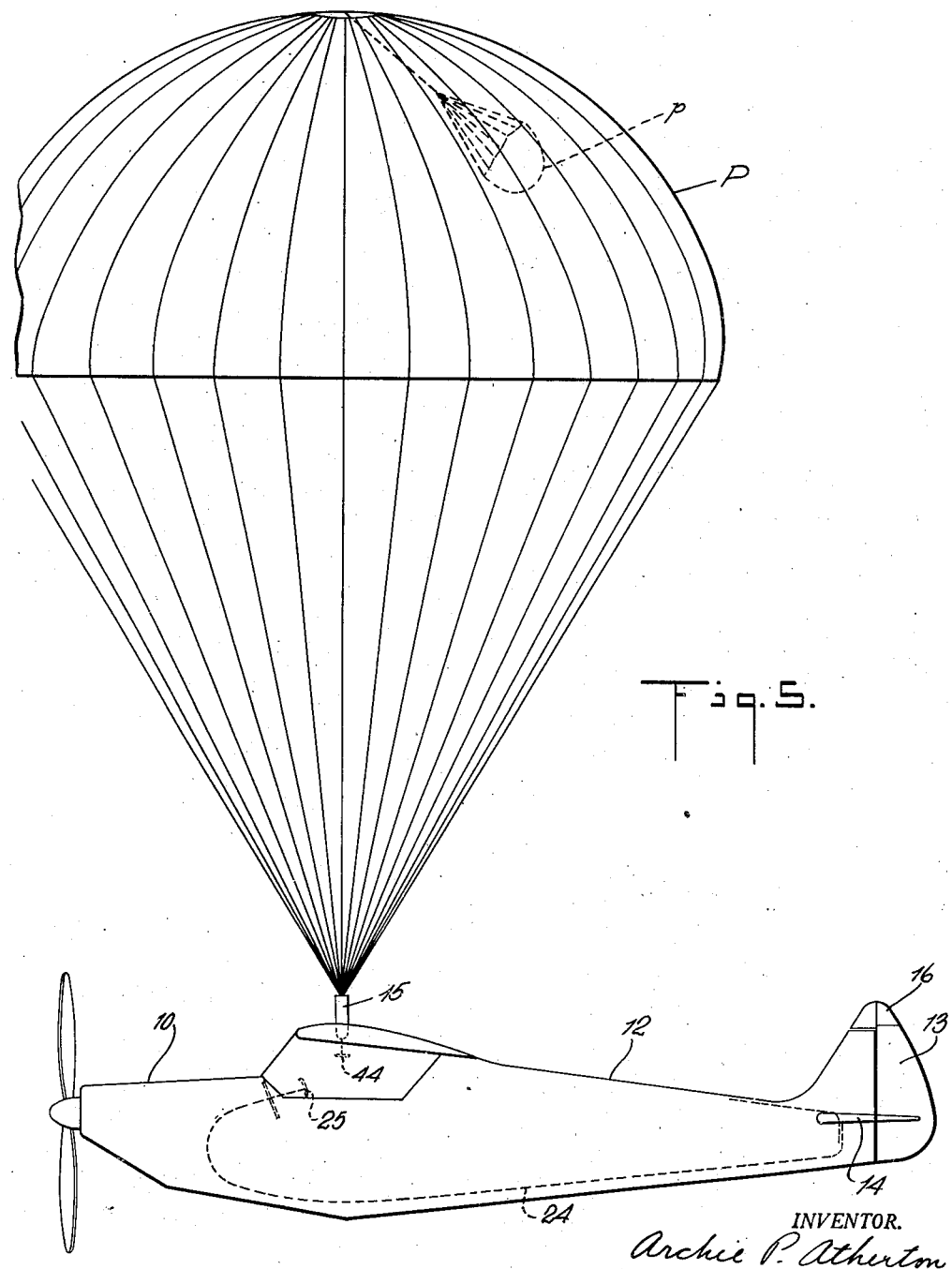
Fig. 5 is a side elevation of an airplane with the main parachute in fully open condition.
Figure 8:
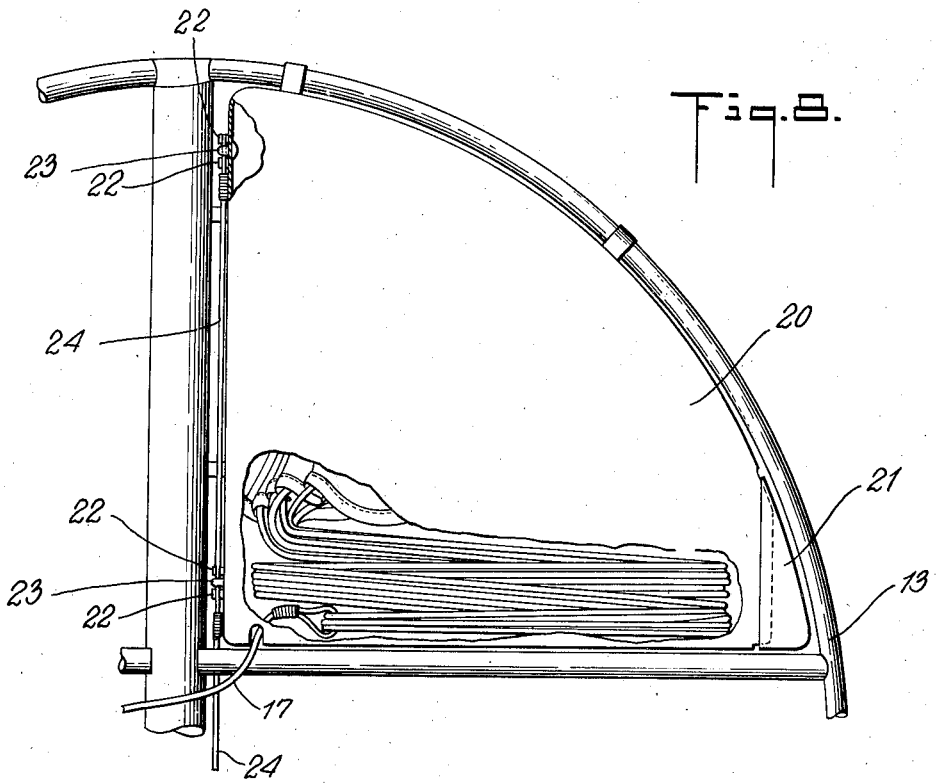
Fig. 8 is an enlarged fragmentary side elevation partially broken away of the tail of the airplane.

The airplane 10 may be of any standard type but it is here shown as having a single continuous wing 11, a fuselage 12, a rudder 13 and elevators 14. The main parachute P is arranged in a pivoted box-like container 15 mounted in a normally closed compartment in the wing 11 and the pilot parachute p is contained in a normally closed compartment 16 formed in the tail portion, the compartment being here shown in the rudder 13 but may be located elsewhere. A cable 17 leads from the ends of the pilot parachute shrouds to the peak of the main parachute, the shrouds of which are connected through the container 15 to the airplane substantially at its center of gravity by means subsequently to be described. The cable 17 preferably lies in a groove provided for it but may lie on the surface of the airplane. In either event, it is covered by a strip of fabric 18 attached to the airplane surface by suitable adhesive. Means, subsequently to be described, releasably anchor the cable 17 at a point near the rear of the fuselage.

Upon development of conditions requiring the use of a parachute, the pilot parachute $p$ is released from the compartment 16 by means subsequently to be described in detail and after stripping off the required amount of the fabric 18, assumes the position shown in Fig. 2 with the cable 17 anchored to the fuselage near its rear end. In the case of tailspins, the pilot parachute may serve to correct the condition, thereby making unnecessary the release of the main parachute. However, in the event that conditions require the release of the main parachute P, the aviator releases the cable 17 from its anchor so that the pilot parachute rises from the position shown in Fig. 2, with concomitant stripping of the remaining fabric 18 from the plane body and releases the main parachute container 15 whereupon the main parachute is pulled by the pilot parachute through the position shown in Fig. 4 and into the position shown in Fig. 5. The plane 10 is thereupon supported by the main parachute P. Should the need for the main parachute cease, the aviator may release it as hereinafter described and again operate the plane in the normal manner.

In the embodiment herein disclosed, the pilot parachute compartment 16 is formed in the upper portion of the rudder. The rudder is hollow and a section of one side of it is made removable. This section consists of a panel 20 closing an opening provided in one side wall of the rudder with a portion of the panel underlying a lip 21 formed in the rudder wall. The panel carries two separated pairs of spaced half-rings 22. The rudder carries two similar half-rings 22a with each half-ring 22a being arranged to extend between a pair of half-rings 22 but facing oppositely to the half-rings 22. A rod 23 extends between each pair of half-rings 22 and associated half-ring 22a and when in position serves to attach the panel to the rudder in conjunction with the lip 21. The pilot parachute $p$ is arranged within the compartment in suitably folded condition and the cable 17 extends through a slot cut in the bottom edge of the panel 22. A line 24 is connected to the pins 23 and leads through suitable guides to a handle 25 in the airplane cockpit, the handle being arranged in a location convenient to the aviator. When the aviator pulls the handle 25, the line 24 disengages the pins 23 from the half-rings 22 and 22a to release the front edge of the panel 20 which is lifted away from the rudder by the stream of air flowing past the rudder and the pilot parachute $p$ is released to be blown out into the position shown in Fig. 2 by the air stream.

The cable 17 is made up of two parts which are joined together by a connector 26 having an eye member 27. A bracket 28 anchored to the fuselage near its rear has an aperture receiving the eye member 27. A pin 29 extending through the eye member 27 engages the bracket 28 to anchor the cable 17 to the rear end of the airplane fuselage. A line 30 leads from the pin 29 through suitable guides to a lost motion connector 31 attached to the line 24. The design of the lost motion connector 31 is such that movement is not communicated from the line 24 to the line 30 until after the panel 20 has been released. The aviator, therefore, may release the pilot parachute $p$ from its compartment while keeping the main parachute anchored as shown in Fig. 2.

The main parachute container 15 is in the form of a narrow box 32 which is hinged by pivots 33 to two brackets 34 having yoke portions 35. The box 32 is closed at its pivoted end and open at its remaining end. Each yoke portion 35 fits over a bar 36 extending between the front spar 37 and the rear spar 38 of the wing 11. A block 39 closes each yoke 35 and has a portion shaped to fit the bar 36. Each block 39 is held in the relation just described by a pin 40 passing through openings in both legs of the yoke and in the block itself. Each pin 40 is connected by a link 41 with the end of an arm 42 extending from a vertical shaft 43 having an operating handle 44 arranged convenient to the aviator. Rotation of the shaft 43 is effective to withdraw the pins 40 to release the blocks 39 thereby permitting disconnection of the container 15 from the airplane. Each end wall of the box 32 is provided with a slot 45 in which is arranged a bar 46. Straps 47 connect the bar 46 to the shrouds of the main parachute P and springs 48 oppose movement of the bar 46 in the slots 45.

Figure 11:
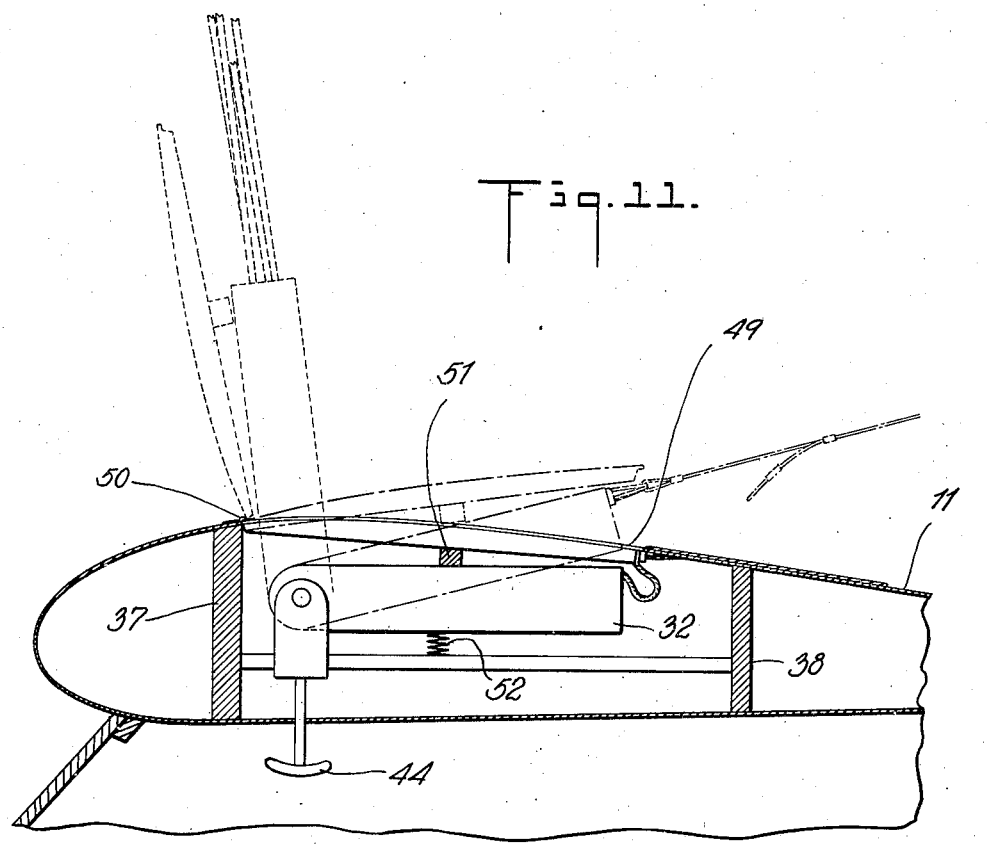
Fig. 11 is a fragmentary central vertical section through the airplane.
Figures 12, 13:
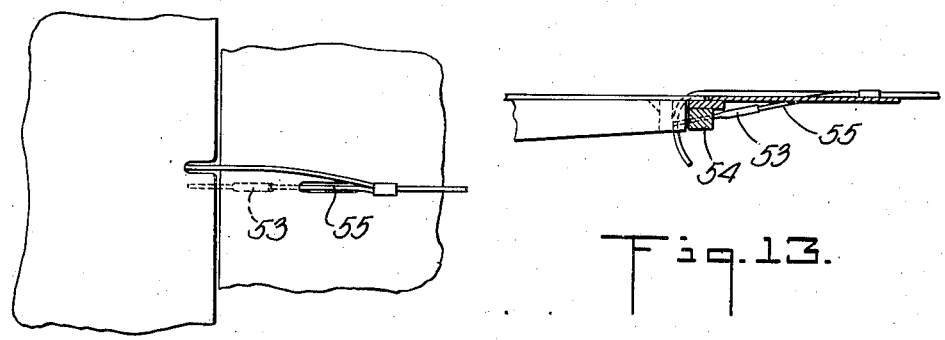
Fig. 12 is an enlarged fragmentary plan view.
Fig. 13 is an enlarged fragmentary view similar to Fig. 11.

The box 32 normally is arranged within the wing 11 as shown in full lines in Fig. 11. Directly above the box 32, the airplane is provided with a cover 49 which is hinged to the wing 11 at 50 and is provided with a buffer 51 engaging the top surface of the box 32. A spring 52 urges the box 32 upwardly to engage the buffer 51 with the lid 49. A pin 53 extends through alined apertures in the bar 54 of the wing structure and the rear end of the cover 49 to retain the latter in closed position. A line 55 connects the pin 53 to the cable 17.

Figure 9:
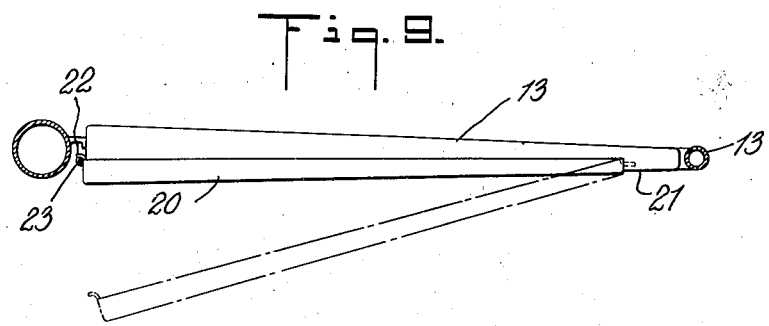
Fig. 9 is a plan view of Fig. 8.
Figure 10:
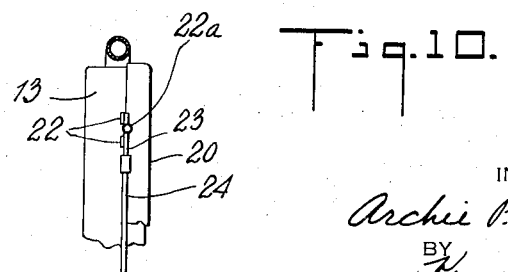
Fig. 10 is a fragmentary front elevation of the rudder.

Upon release of the cable 17 by withdrawal of the pin 29 from the eye member 27, the pilot parachute $p$ pulls the cable 17 to withdraw the pin 53 from locking relation to the cover 49 whereupon the cover and the box 32 move into the dot-dash position shown in Fig. 11, and the pilot parachute $p$ begins to withdraw the main parachute P from the box 32. When the main parachute P has been completely withdrawn from the box 32 and has opened, the box 32 assumes the position shown in Fig. 4 and also in dotted lines in Fig. 9. The airplane 10 is now supported by the parachute P, as shown in Fig. 5. The initial shock occasioned upon opening of the parachute P is cushioned by the springs 48 and the airplane is supported from the parachute through the pivots 33, brackets 35, cross-rods 36 and spars 37 and 38. If at any time the pilot wishes to release the airplane from the parachute, he may do so merely by rotating the shaft 43 by actuation of the handle 44 to disengage the pins 40 from the blocks 39.

It is of course to be understood that various modifications may be made in the apparatus herein described without in any way departing from the spirit of the invention as defined in the appended claims. Also, while the invention has been disclosed as embodied in one type of aircraft, it is to be understood that the invention is equally applicable to other kinds of aircraft and that the particular embodiment herein disclosed is merely illustrative but in no way limitative of the scope of the invention.

I claim:

1. In an airplane, a main parachute fastened thereto, a normally closed compartment for receiving said parachute in collapsed condition, a pilot parachute, a compartment in the airplane tail for receiving said pilot parachute in collapsed condition, a releasable cover for said last-named compartment, a cable connecting the shroud ends of the pilot parachute to the peak of the main parachute, means releasably anchoring said cable to said airplane fuselage adjacent the airplane tail, and means operable by the aviator for successively releasing said cover and said cable-anchoring means.

2. In an airplane, a main parachute fastened thereto, means for releasably retaining said main parachute in collapsed condition within the airplane, a pilot parachute, a compartment in the airplane tail for receiving said pilot parachute in collapsed condition, a releasable cover for said compartment, a cable connecting the shroud ends of the pilot parachute to the peak of the main parachute, means releasably anchoring said cable to said airplane adjacent the tail thereof, means operable by the aviator for successively releasing said cover and said cable-anchoring means, and means operable by said cable for releasing said main parachute retaining means.

3. In an airplane, a main parachute fastened thereto, means for releasably retaining said main parachute in collapsed condition within the airplane, a pilot parachute, a compartment in the airplane tail for receiving said pilot parachute in collapsed condition, a releasable cover for said compartment, a cable connecting the shroud ends of the pilot parachute to the peak of the main parachute, means releasably anchoring said cable to said airplane adjacent the tail thereof, and means for successively releasing said cover, said cable-anchoring means and said main parachute-retaining means.

4. In an airplane, a main parachute releasably connected thereto, means for releasably retaining said main parachute in collapsed condition within the airplane, a pilot parachute, a compartment in the airplane tail for receiving said pilot parachute in collapsed condition, a releasable cover for said compartment, a cable connecting the shroud ends of the pilot parachute to the peak of the main parachute, means releasably anchoring said cable to said airplane adjacent the tail thereof, means operable by the aviator for successively releasing said cover and cable-anchoring means, means operable by said cable for releasing said main parachute-retaining means, and means operable by the aviator for disconnecting the main parachute from the airplane.

5. In an airplane, a main parachute releasably connected thereto, means for releasably retaining said main parachute in collapsed condition within the airplane, a pilot parachute, a compartment in the airplane tail for receiving said pilot parachute in collapsed condition, a releasable cover for said compartment, a cable connecting the shroud ends of the pilot parachute to the peak of the main parachute, means releasably anchoring said cable to said airplane adjacent the tail thereof, means for successively releasing said cover, said cable-anchoring means and said main parachute-retaining means, and means operable by the aviator for disconnecting the main parachute from the airplane.

6. In an airplane, a main parachute fastened thereto, means for releasably retaining said main parachute in collapsed condition within the airplane, a pilot parachute, a compartment in the airplane tail for receiving said pilot parachute in collapsed condition, a releasable cover for said compartment, latch means for said cover, a cable connecting the shroud ends of the pilot parachute to the peak of the main parachute, latch means for anchoring said cable adjacent the airplane tail, a member connected to said cover latch means and movable by the aviator to release the same, and a lost motion connection between said anchor latch means and said member.

7. In an airplane, a compartment having a pivoted cover, a latch member for retaining said cover in closed position, a box-like container within said compartment open at one end, means pivotally supporting said container at its closed end, a parachute stored in said container, shock-absorbing connections between the parachute shrouds and the container, and means controlled by the aviator for releasing said latch member and effecting withdrawal of said parachute from said container.

8. In the combination according to claim 7, means for detachably connecting the container supporting means to the airplane, and means operable by the aviator for releasing said connecting means.

9. In an aircraft, a main parachute fastened thereto and stowed therein, a pilot parachute stowed in the aircraft, a cable connecting the shroud ends of the pilot parachute to the peak of the main parachute, means for releasably anchoring said cable to the aircraft at a point adjacent the stowage location of the pilot parachute, and means operable by the aviator for successively releasing said pilot parachute and said cable anchoring means.

10. In an aircraft, a main parachute fastened thereto and stowed therein, a pilot parachute stowed in the aircraft, a cable connecting the shroud ends of the pilot parachute to the peak of the main parachute, means for releasably anchoring said cable to the aircraft at a point adjacent the stowage location of the pilot parachute, means operable by the aviator for successively releasing said pilot parachute and said cable anchoring means, and means operable by said cable for releasing said main parachute.

11. In the combination according to claim 7, means operable by the aviator for releasing the parachute from the airplane.

ARCHIE P. ATHERTON.